A. V. ROE.
RESILIENT TIRE.
APPLICATION FILED NOV. 17, 1920.
1,421,029.  Patented June 27, 1922.
3 SHEETS—SHEET 2.
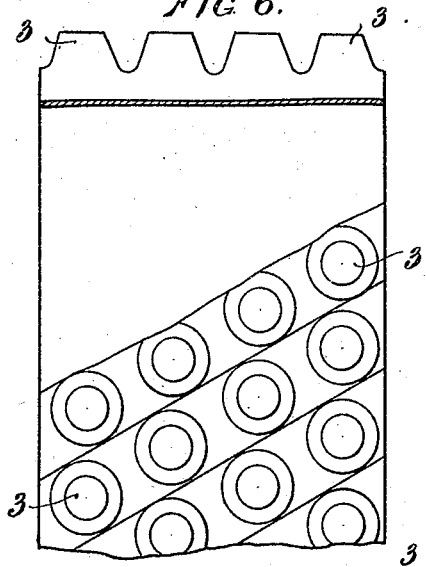
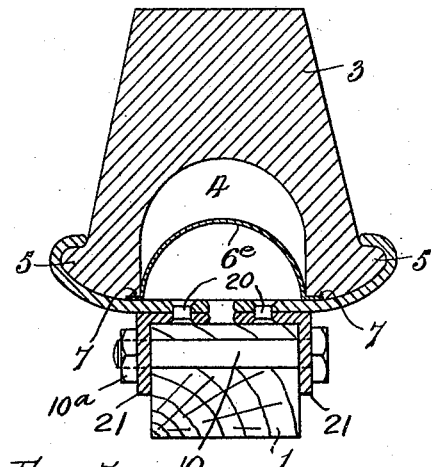
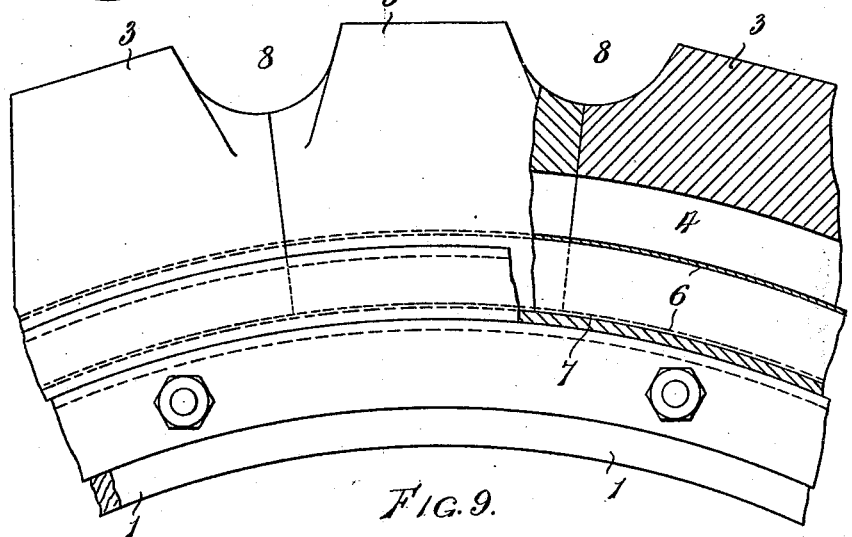
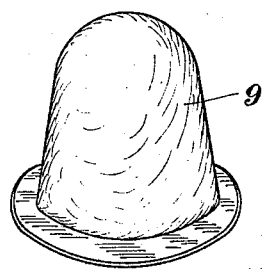
INVENTOR:
Alliott V. Roe
By Wm Wallace White
ATTY.

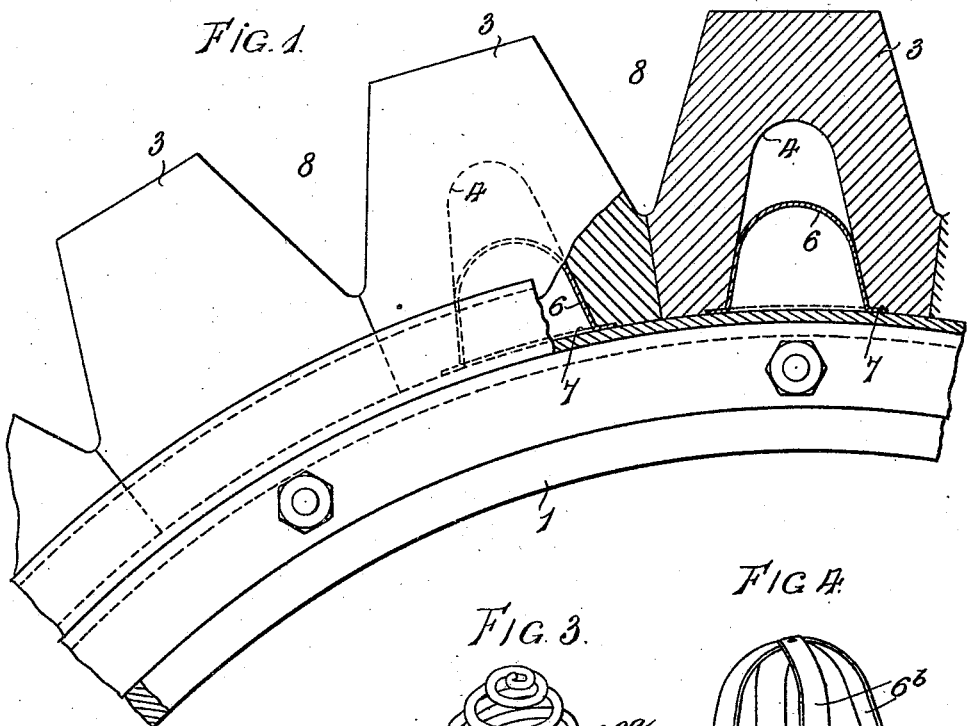

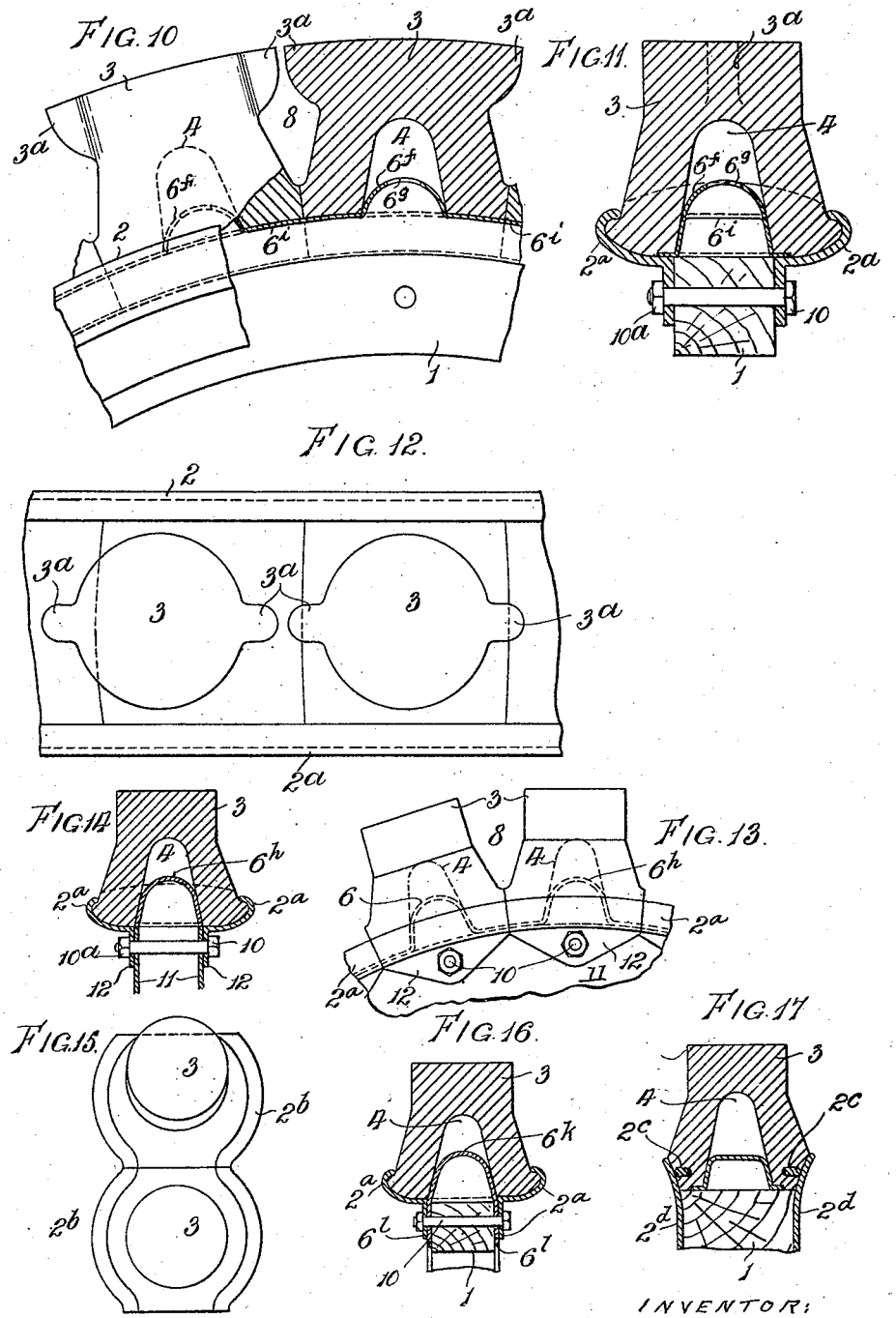

UNITED STATES PATENT OFFICE.

ALLIOTT VERDON ROE, OF BURSLEDON, ENGLAND.

RESILIENT TIRE.

1,421,029.  Specification of Letters Patent.  Patented June 27, 1922.

Application filed November 17, 1920. Serial No. 424,625.

*To all whom it may concern:*

Be it known that I, ALLIOTT VERDON ROE, a subject of the King of Great Britain, residing at High Firs, Bursledon, in the county of Hants, England, have invented new and useful Improvements in Resilient Tires, of which the following is a specification.

The invention relates to resilient tires for road vehicles and the like and has particular reference to tires of the solid or semi-solid type, wherein resilience is attained wholly or mainly by utilizing the shock-absorbing qualities of the structural material.
In tires of this type, as hitherto constructed, as well as in pneumatic tires, a large amount of energy is wasted by reason of the flattening and spreading of the tire at its region of contact with the road surface.
Such spreading is resisted in a circumferential direction by sections of the tire adjacent the region of contact and to this circumferential resistance the above mentioned loss of energy is mainly due.
It is the primary object of my present invention to overcome this disadvantage and avoid waste of energy by providing a tire of improved construction wherein the compressional stresses arising in the area of contact between the tread and the road surface are directed into walls of resilient material disposed substantially perpendicularly to the said surface of contact but are prevented from being transmitted in a circumferential direction around the tire.

A secondary object of my invention is fulfilled in the provision of improved means for supporting the tire internally and ensuring its secure attachment to the rim of a vehicle wheel.

In carrying my invention into effect I construct the tire of a plurality of relatively narrow transverse strips, studs or blocks of rubber, or equivalent shock absorbing material, disposed circumferentially around the wheel rim and preferably abutting or conjoined with each other adjacent the bed of the rim but otherwise separated by deep transverse grooves extending preferably from adjacent the hook or flange of the rim to the tread so that the compressional stresses in any stud or block which may happen to be in contact with the road surface are not transmitted circumferentially through the tread to the next adjacent blocks.

The base of the tire may be engaged in a channel shaped rim or a rim of the ordinary well known hooked section and it will be understood that the sides of the resilient studs or blocks adjacent their bases are conformed to suit the type of rim employed but in order to strengthen the foundation of the tire and to preclude the possibility of any lateral movement between the tire sections and the rim, each resilient stud or block is reinforced internally with a rigid supporting member or thimble which co-acts with the known securing means in a manner which will hereinafter be made apparent.

Within each resilient block or stud is a cavity adapted to accommodate the internal supporting means or thimble and said cavity is of greater depth than said thimble in order to avoid undue weight and solidity.

And in order that my said invention may be more clearly understood and readily carried into effect I will proceed aided by the accompanying drawings more fully to describe the same.

Figure 1 is a side elevation, partly in section, of part of a wheel rim having a tire constructed according to the present invention applied thereto.

Figure 2 is a transverse section thereof, said section being taken through one of the blocks.

Figure 3 is a perspective view of a modified form of internal reinforcing member or thimble.

Figure 4 is a similar view to Figure 3 illustrating a further modification in the construction of the thimble.

Figure 5 is a similar view to Figure 4 illustrating a still further modification in the construction of the thimble.

Figure 6 is a diagrammatic view illustrating the application of the invention to a heavy wheel having a broad tread.

Figure 7 is a similar view to Figure 1 illustrating a modification.

Figure 8 is a transverse section thereof.

Figure 9 is a perspective view of a cover or hood for the thimble.

Figure 10 is a similar view to Figure 1 illustrating a further modification in the construction of the tire.

Figure 11 is a transverse section thereof.

Figure 12 is a plan thereof.

Figure 13 is a similar view to Figure 10 illustrating a still further modification.

Figure 14 is a transverse section thereof.

Figure 15 is a plan thereof.

Figure 16 is a transverse section illustrating a further modification and

Figure 17 is a transverse section illustrating a still further modification.

In the several figures of the drawings like parts are indicated by similar reference numerals and Figure 6 is drawn to a reduced scale with respect to the other figures of the drawings.

Referring to Figures 1 and 2, 1 represents the felloe of the wheel, 2 represents the rim and 3 represents the studs or blocks of rubber or equivalent resilient material each of which is formed with an internal recess or cavity 4 and at their sides are furnished with beads 5 which take under the curled over edges of the rim 2 as shown in Figure 2.

A number of these studs or blocks 3 are placed end to end in the rim 2 so as to form a continuous annular tire whose internal circumference corresponds to the external circumference of the bed of the rim 2, the beads 5 forming a continuous bead on each side of said blocks 3.

Each stud or block 3 is rectangular at its base but merges into a circular and tapered or truncated conical formation towards the tread of the tire so that V shaped spaces are left between each pair of studs or blocks 3 as shown at 8, Figure 1. It will however be readily understood that the studs 3 may be of oval, diamond shape or other appropriate section, generally of smaller area than the section at the base. Said circular or angular formation of the studs 3 prevents the lodgment of stones and other foreign matter in the spaces 8.

Within the cavity 4 is inserted a thimble 6 which may take the form of a light metal cup conformed to fit closely and somewhat tightly in the cavity 4 but is of less depth so that an air space is left between the crown of the thimble or cup 6 and the crown of the cavity 4. The open end of the thimble or cup 6 rests upon the bed of the rim 2 and is furnished with a peripheral flange 7 in order to provide an adequate bearing surface therefor.

The function of the thimble or cup 6 is three fold:—Firstly, its use permits the resilient material of the tire to be concentrated mainly in comparatively thin walls from the tread to the base, in other words the rubber is placed where it is able to do its work efficiently. Secondly, it tends to transfer tangential forces acting upon the tread of the tire to the base thereof, where they can more adequately be resisted. Thirdly, it co-operates with the beaded edges of the rim to clamp the tire against lateral or transverse displacement.

Further, it will be observed that, in the event of serious damage to the tread or walls of any of the studs 3 the crown or crowns of the cup or cups 6 may temporarily bear the load and prevent contact between the road surface and the rim 2.

In the example given at Figure 3 the construction of the thimble or cup $6^a$ is modified, being formed of wire coiled spirally as shown.

In the example given at Figure 4 the thimble or cup $6^b$ is of spider or skeleton formation being composed of two strips of metal bent into the requisite form and arranged at right angles to one another and united by any suitable means at the crown of the thimble or cup $6^b$.

In the example given at Figure 5 the thimble or cup $6^c$ is formed with a solid crown supported by legs $6^d$ and may conveniently be formed by pressing out of a plain sheet of metal.

In Figure 6 is illustrated diagrammatically a convenient arrangement of several circumferential rows of studs 3 applied to a wheel with a broad tread in which case said studs 3 are arranged in staggered formation in the lateral direction, or said studs 3 might be arranged in any other desired manner upon the tread of the tire or wheel.

In the example given at Figures 7 and 8 the separate thimbles or cups 6 are dispensed with and in lieu thereof is provided a continuous metal strip or channel $6^e$ of arched formation as shown extending completely around the bed of the rim 2.

In the form shown in section in Figs. 2 and 8, each half of the rim is secured by means of rivets 20 to an annular member 21 of L-shape in cross section, one flange of each of said members extending along the side of the felloe and said flanges being secured together and to the felloe by means of bolts 10 passing therethrough and secured by nuts $10^a$, as clearly shown in said figures. The tire sections may be assembled in the rim in any convenient manner; for example, the nuts $10^a$ may be unscrewed so as to permit the two sides of the rim to spread apart sufficiently to enable the beads of the sections to be inserted, whereupon the nuts may be tightened up.

In the example given at Figure 9 is illustrated a hood 9 formed of any suitable material but preferably of textile material for covering the thimbles or cups 6 in order to prevent the same wearing away the interiors of the cavities 4 of the studs or blocks 3.

In the example given at Figures 10 to 12 the studs 3 are formed with lateral wings or projections $3^a$ which partly bridge over the spaces 8 this construction having for its object to render the tread of the tire as continuous as possible and thus prevent bumping and the uneven wearing of the blocks or studs 3.

In this example also the continuous metal strip or channel $6^i$ is furnished with cup or thimble like excrescences $6^f$, as shown, which project into the recesses 4 in the blocks 3 and take the place of the cups or thimbles hereinbefore described. The excrescences 6f are in this case furnished with perforations 6g having for their object to prevent heating of the walls of the recesses 4.

Further, the rim of the wheel is formed in two separate halves 2a arranged one on each side of the felloe 1 of the wheel and fastened thereto by means of headed bolts 10 and nuts 10a as shown more particularly at Figure 11.

In other respects the construction of the tire is similar to that hereinbefore described with respect to Figures 7 and 8.

In the example given at Figures 13 to 15 is illustrated a further modification in the construction of the tire. In this case the device is shown applied to a metal wheel formed of disks, portions of which are shown at 11 the periphery of which is pressed out into cup or thimble like excrescences 6h and the rim 2a is formed in sections, each section corresponding in length with the base of each block or stud 3 and each section is circumferentially of convex formation as shown at 2b Figure 15, the blocks or studs being similarly formed while each section of the rim 2a is formed with a downwardly projecting flange 12 which are perforated and the sections on each side of the wheel are bolted together and to the disks 11 by their flanges 12 in a similar manner to that described with respect to Figure 11.

This construction enables any block or stud 3 which happens to have become damaged to be replaced with a new one without disturbing the rest of the tire.

In the example given at Figure 16, the cups or thimbles 6k are formed on a rim 6l in a similar manner to that described with respect to Figures 10 to 12 but in this case said rim is extended so as to embrace the wooden felloe 1 of the wheel and perforated to receive the bolts 10 which pass through the rim 2a and the rim 6l and felloe 1, as shown, so that both said rims are securely clamped in position by the bolts 10.

In the example given at Figure 17 is illustrated the application of a tire constructed according to the present invention to a further modified form of rim.

In this case the rim 2d is furnished with internal circumferential flanges 2c and the blocks or studs 3 are furnished with coacting recesses into which said internal flanges 2c take and hold said blocks or studs firmly in position.

The internal flanges 2c may be formed integral with the rim 2d as shown or they may be attached thereto in any suitable manner.

In some cases when employing an ordinary curled over rim the blocks or studs 3 may be provided with recesses adapted to embrace the edges of said rim.

From the foregoing it will be observed that in all forms of the device herein illustrated, the shape of the openings in the flexible sections and the exterior of the supporting members or thimbles is such that these members exert a wedging action on the walls of the sections.

It will be understood that the rubber or other resilient material of the studs or blocks 3 may be strengthened and reinforced in any requisite and known manner, as, for instance, by moulding suitable fabric into it, while the tread portions may be provided with the usual studs, ridges or grooves for the purpose of preventing skidding and side slip and that the details of construction of the tire may be otherwise modified without departing from the principle of the invention.

Having thus described my invention, what I claim is:—

1. A resilient tire, comprising, in combination with a rim, a plurality of resilient sections each having an air chamber opening inwardly from its base, said rim and sections having inter-engaging portions for retaining the sections on the rim, and a plurality of metallic members carried by the rim and extending into said air chambers and forming therewith air spaces within said sections, the side walls of said members and air chambers converging from the outer towards the inner ends thereof thereby to produce a wedging action on said sections.

2. A resilient tire, comprising, in combination with a rim, a plurality of resilient sections each having an air chamber opening inwardly from its base, said rim and sections having inter-engaging portions for retaining the sections on the rim, and a plurality of hollow metallic members carried by the rim and extending into said air chambers, said metallic members and chambers being of approximately conical formation thereby to produce a wedging action on the resilient sections.

3. A resilient tire, comprising, in combination with a rim, a plurality of resilient sections each having an approximately cone-shaped-air chamber opening inwardly at its base, said rim and sections having cooperating portions for retaining the sections on the rim, and metallic members, one for each resilient section, carried by the rim and extending within said air chambers, said members corresponding in shape with the air chambers but terminating short of the inner ends of said chambers, the side walls of said members and chambers being normally in contact thereby to produce a wedging action on the sections.

In testimony whereof I have signed my name to this specification.

ALLIOTT VERDON ROE.

Witness:
HERBERT ROWLAND ABBEY.